United States Patent [19]

Inoue

[11] Patent Number: 4,524,543
[45] Date of Patent: Jun. 25, 1985

[54] VIBRATORY ABRASIVE CONTOUR-FINISHING METHOD AND APPARATUS

[75] Inventor: Kiyoshi Inoue, Tokyo, Japan

[73] Assignee: Inoue-Japax Research Incorporated, Yokohama, Japan

[21] Appl. No.: 541,667

[22] Filed: Oct. 13, 1983

[30] Foreign Application Priority Data

Oct. 18, 1982 [JP] Japan .................................. 57-181258

[51] Int. Cl.³ ................................................ B24B 7/00
[52] U.S. Cl. ..................................... 51/34 R; 51/34 H; 51/59 SS; 51/165.92
[58] Field of Search ................... 51/34 R, 34 H, 59 SS, 51/165.92

[56] References Cited

U.S. PATENT DOCUMENTS 3,015,914  1/1962  Roney ................................. 51/59 SS
3,699,719 10/1972  Rozdilsky et al. ................. 51/59 SS Primary Examiner—Frederick R. Schmidt
Assistant Examiner—J. T. Zatarga
Attorney, Agent, or Firm—Karl F. Ross; Herbert Dubno

[57] ABSTRACT

Vibratory abrasive contour-finishing method and apparatus in which an axial tool longitudinally vibrated at a high-frequency is rapidly rotated about its longitudinal axis to provide a rapidly reciprocatingly revolving active tool surface for pressure engagement with a shaped surface of a workpiece in the presence of abrasive grits while the tool and the workpiece are relatively displaced translationally to move the active tool surface along the shaped surface to progress the abrasive polishing along it. The load or reciprocatingly revolving resistance encountered by the active tool surface is instantaneously sensed to produce an output signal representing a change therein. A control circuit responds to the output signal and acts on a drive unit for the relative translational displacement between the tool axis and the workpiece so as to maintain the load or resistance substantially constant.

4 Claims, 3 Drawing Figures

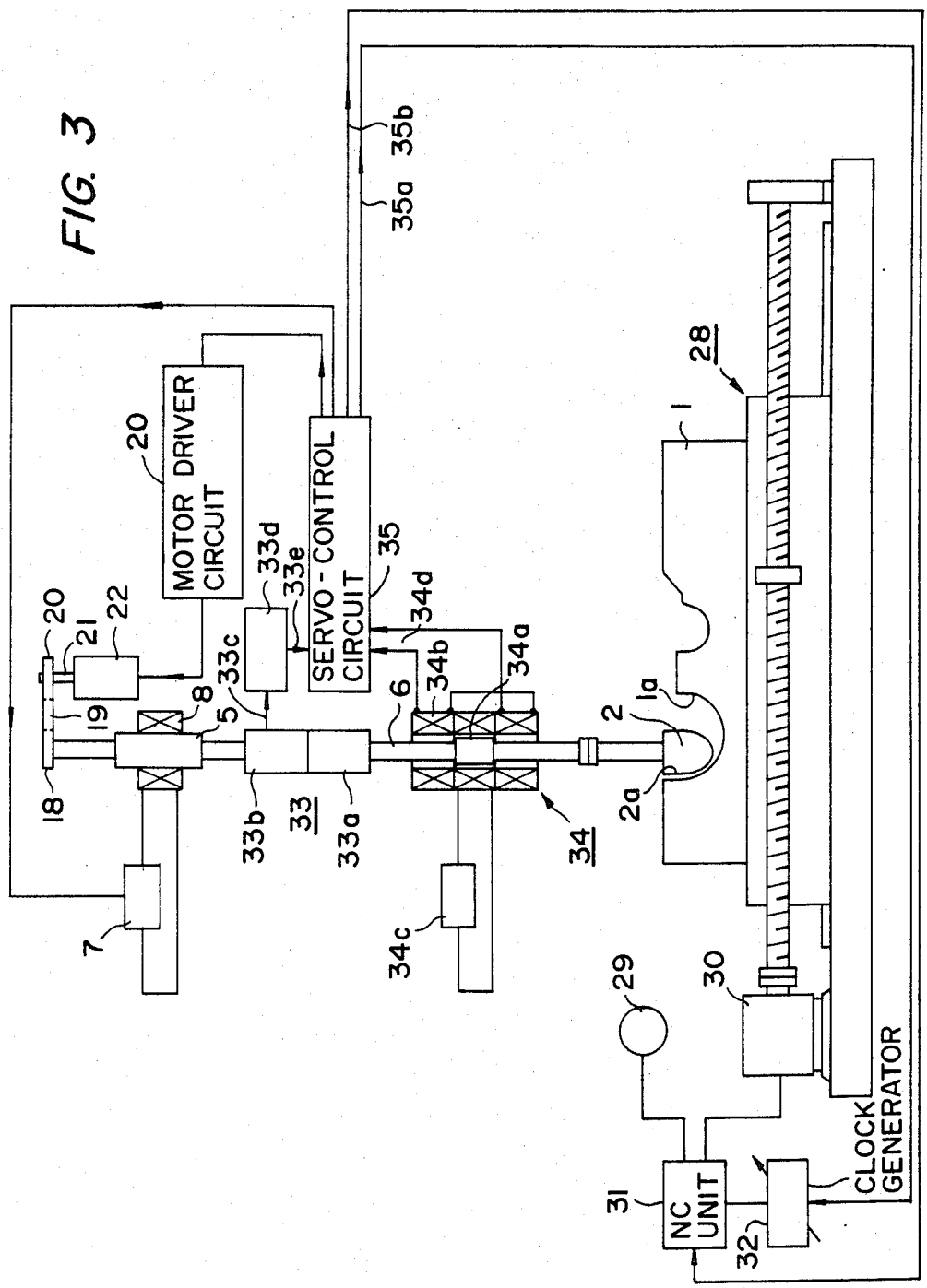

VIBRATORY ABRASIVE CONTOUR-FINISHING METHOD AND APPARATUS

FIELD OF THE INVENTION

The present invention relates to abrasive finishing and, more particularly, to an improved method of and apparatus for abrasively finishing a shaped workpiece surface with an axially vibrating tool by means of abrasive grits.

BACKGROUND OF THE INVENTION

There is known in the art an abrasive process in which an axial vibratory tool is brought into pressure contact with a workpiece surface in the presence of abrasive grits. The grits may be a part of the tool by being secured thereto, or otherwise supplied in a fluid suspension into the polishing interface. The axial tool is longitudinally vibrated at a frequency typically in an ultrasonic range to produce highly accelerating forces which drive the abrasive grits to impact upon the workpiece surface and cause an accelerated abrading action thereover. This technique has hitherto been employed primarily for shaping purposes where a substantial amount of stock is to be removed roughly from blank materials such as carbides, ceramics and glass which are commonly brittle.

When an attempt is made to apply the abrasive process described to the precision-finishing of a shaped workpiece with an intricate surface contour, as encountered in the die or mold making field, on an automatic basis, there arise difficulties as to the accuracy and finish quality of the processed surface as well as the rate of finishing attainable by the process. Firstly, the surface finish obtained thereby is relatively poor. Secondly, it would be necessary to displace the active portion of a tool relative to the workpiece precisely along a given path corresponding to the shaped contour in the workpiece while holding a polishing tool and workpiece interface interposed by the abrasive grits.

To this end, numerical path control or template copying control may be employed to advance the tool along a programmed path and at a rate of advance necessary to maintain the required polishing tool and workpiece interface interposed by the abrasive grits. In establishing the rate of advance, inasmuch as the roughly shaped contour for finishing is characterized by a surface irregularity and hence the slight amount of stock to be finish-removed varies from one position to another on the contour it is necessary to set the rate at a minimum value in consideration of a portion requiring the maximum amount of stock removal. Thus, the operation is unavoidably time-consuming.

Furthermore, the tool wear, insofar as unavoidable, must be taken into account in determining the actual path of the tool advance. Without determination of the precise information of the tool wear, finishing would never be achieved with a due precision because a tool shift from a given contour cannot be obtained so as to compensate for the tool wear. In the process described, however, the tool wears unavoidably as biased or with unevenness over its peripheral surface, and yet in a highly complicated format which it is indeed impossible to determine insofar as the precise details of the surface irregularity of the shaped workpiece surface and hence the precise amounts of localized stock removal as required are practically undefinable which are further complicated when taken with the precise details of intricacy of the shaped contour to be finished. Thus, if a path of the tool advance is adequately defined according to the finishable surface contour of a shaped workpiece, it would be almost impossible to provide a properly modified path for the actual advance of the tool relative to the workpiece which precisely compensates for the tool wear.

Moreover, while it may be desirable to maintain a constant axial or lateral pressure to urge the tool against the finishable surface, the abrading action would unavoidably change due to the large or irregular change in the effective abrading contact area so that the accuracy and finish quality of the polished surface contour would be far less than satisfactory.

OBJECTS OF THE INVENTION

Accordingly, the present invention seeks to provide a new and improved method of abrasively polishing a shaped workpiece surface with an axial tool by means of abrasive grits with a view to overcoming the foregoing difficulties and to seek to provide a new and improved apparatus for carrying out the method described.

SUMMARY OF THE INVENTION

According to the present invention there is provided, in a first aspect thereof, a method of abrasively finishing a shaped workpiece surface with a vibratory axial tool by means of abrasive grits, which method comprises the steps of: (a) rotating the axial tool about a longitudinal axis thereof while vibrating it in the direction of that axis to provide a reciprocatingly revolving active tool surface; (b) bringing the reciprocatingly revolving active tool surface into pressure engagement with a portion of the shaped surface of the workpiece in the presence of the abrasive grits therebetween; (c) relatively displacing the tool and the workpiece generally translationally and transverse to the said longitudinal axis so that the reciprocatingly revolving active tool surface sweeps starting with the said portion and successively over an entire area of the said shaped surface while maintaining the abrasive pressure engagement therewith; (d) instantaneously sensing a load encountered by the reciprocatingly revolving active tool surface in the abrasive pressure engagement with the shaped surface to produce an output signal representing an instantaneous change in that load; and (e) in response to the said output signal, controlling the relative translational displacement between the tool and the workpiece so as to maintain the load exerted on the reciprocatingly revolving active tool surface substantially constant. Specifically, the load is a reciprocatingly revolving resistance imposed on the active tool surface from the shaped surface in abrasive pressure engagement therewith, and in step (e) the rate of relative displacement is controlled in accordance with the output signal representing an instantaneous change in the said resistance.

Preferably, in carrying out step (d) a programmed path corresponding to a final finished contour of the shaped surface is established for displacement of the said axis of the tool relative to the workpiece. In step (d) there is derived from the said output signal a further instantaneous signal representing a wear of the said active tool surface, and in step (e) the programmed path is modified in accordance with the further output signal so as to maintain the reciprocatingly revolving resistance encountered by the active tool surface substantially constant.

The invention also provides, in a second aspect thereof, an apparatus for abrasively finishing a shaped workpiece surface with an axial tool by means of abrasive grits in which the axial tool is vibrated in the direction of a longitudinal axis thereof by first drive means, which apparatus further comprises: second drive means for rotating the vibrating tool about the said axis to produce a reciprocatingly revolving active tool surface; means for positioning the tool and the workpiece relative to each other to bring the reciprocatingly revolving active tool surface into pressure engagement with a portion of the shaped surface of the workpiece in the presence of the abrasive grits therebetween and to relatively displace the tool and the workpiece generally translationally and transverse to the said longitudinal axis so that the reciprocatingly revolving active tool surface sweeps starting with that portion and successively over an entire area of the shaped surface while maintaining the abrasive pressure engagement therewith; means for instantaneously sensing a load encountered by the reciprocatingly revolving active tool surface in the abrasive pressure engagement with the shaped surface to produce an output signal representing an instantaneous change in that load; and means responsive to the said output signal for controlling the relative translational displacement between the tool and the workpiece so as to maintain the load exerted on the reciprocatingly revolving active tool surface substantially constant.

BRIEF DESCRIPTION OF THE DRAWINGS

These and other features of the present invention as well as advantages thereof will become readily apparent from a reading of the following description when taken with reference to the accompanying drawings in which:

FIG. 3 is a side or front view diagrammatically illustrating an apparatus similar to that shown in FIG. 2 and in the process of finishing a different contour rough-shaped in the workpiece.

SPECIFIC DESCRIPTION

Figure 1:
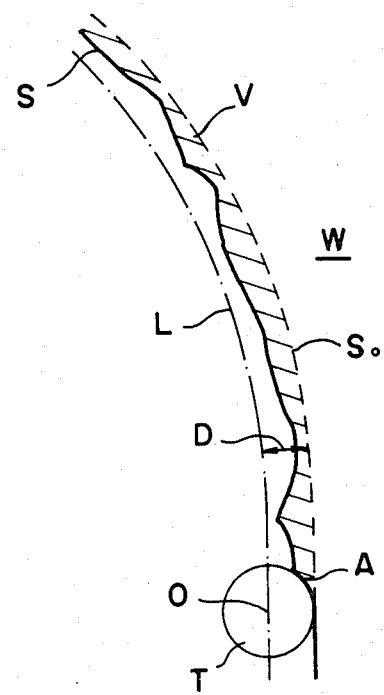
FIG. 1 is a plan view diagrammatically illustrating an axial tool in the process of abrasively finishing a rough-shaped contour in a workpiece.

In FIG. 1 there is shown a surface contour S roughly shaped in a workpiece W. It is desired that the contour S be abrasively finished with a vibratory cylindrical tool T to give rise to a desired finish contour So. To this end it is seen that a slight volume of stock V remaining at the hatched portion need be removed with precision. The tool T is vibrated in the direction of its longitudinal axis O and as shown perpendicular to the sheet of drawing. Abrasive grits are disposed in the region of the interface between the workpiece W and the vibrating tool T laterally held in pressure contact therewith while the tool T and the workpiece W are relatively displaced translationally along a path L which is spaced by the distance D or the radius of the tool T from the final contour So. The path L thus corresponds basically to the final contour So, but, for its determination, the progressive abrasive wear of the tool T must be taken into account. Yet, in the arrangement shown and described, the tool T wears as biased on the right-hand side so that its profile becomes non-circular. Furthermore, due to the inherent irregularity of a rough-shaped contour S, the tool T must encounter a varying area A and hence a varying load from one position to a next to remove stock V left to be removed. As a result, it would practically be impossible to precisely predict the instantaneous distance or shift D and hence the path L. When the contact area A increases, there drops the effective pressure for abrading and the effective amount of abrasive grits becomes deficient. If the tool T is then allowed to advance, it is possible that there occurs an unpredictable sudden change in the load and unavoidably a serious finishing error develops. The present invention seeks to overcome these problems.

Figure 2:
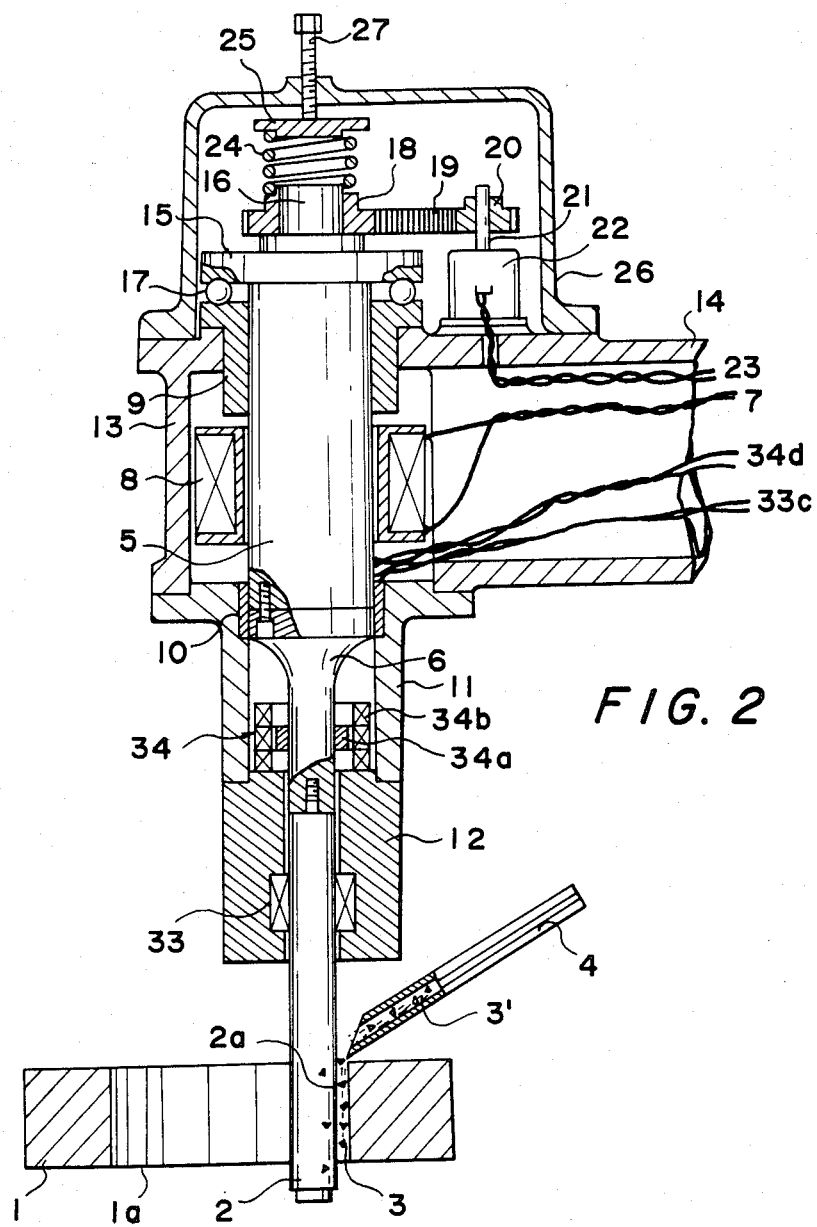
FIG. 2 is a side or front elevational view, partly in section, diagrammatically illustrating a portion of an abrasive finishing apparatus embodying the present invention.

Referring to FIGS. 2 and 3, a workpiece designated at 1 is shown as being abrasively finished with a vibratory axial tool 2. In the arrangement of FIG. 2, the tool 2 is cylindrical and laterally urged against an internal contour 1a roughly shaped in the workpiece 1. In the arrangement of FIG. 3, the tool 2 has an active portion of a cup-shaped profile which is in engagement with a three-dimensional contour 1a again roughly shaped in a workpiece 1. It is essential that the tool profile by symmetrical about its axis as will be apparent. Abrasive grits 3 as shown in FIG. 2 may be continuously introduced into the tool and workpiece interface in a fluid suspension 3', which is delivered from a suitable nozzle 4. Alternatively, the abrasive grits 3 may be a part of the tool 2 by being prebonded thereto.

The tool 2 is longitudinally vibrated by means of an electromechanical transducer 5 which is secured thereto via an amplifier horn adapter 6 (FIG. 2). Energized by a high-frequency power supply 7 (FIG. 3), a coil 8 is wound around the transducer 5 to impart thereto a mechanical oscillation of a frequency, e.g. from 10 to 100 kHz, preferably 20 to 50 kHz, which upon amplification by the horn adapter 6 is transmitted to vertically vibrate the tool 2. As shown in FIG. 2, the transducer 5 is journaled by means of bearings 9 and 10 so that it, the horn adapter 6 and the tool 2 secured together may as a unitary body be freely vibrated in the vertical direction. The lower bearings 10 are a part of a lower housing 11 accommodating the horn adapter 6 therein and having a bored block 12 secured thereto through which the tool 2 is arranged to project. The upper bearings 9 are a part of a housing 13 provided at an end portion of a horizontally extending arm 14 which is vertically displaceably mounted on a machine column (not shown) standing upright on a machine base (not shown).

The columnar transducer 5 has at its upper end portion a fitting comprising a flange 15 and a spindle 16 both of which may be considered unitary with the transducer 5. The flange 15 is seated on the upper bearing part 9 via ball bearings 17 and the spindle 16 has a pulley 18 securely fitted thereon which is connected via a transmission belt 19 with a pulley 20, the latter being securely fitted on the output shaft 21 of an electric motor 22 securely seated on the arm 14 and energizable by a motor drive circuit 23. A compression spring 24 is disposed between a pressure plate 25 and the pulley 18 on the spindle 16 to bias downwards the flange 15, the transducer 5, the horn adapter 6 and the tool 2 secured together while permitting them to be unitarily rotated by the output of the motor 22. All the elements 15-25 are accommodated within a cover 26 seated across the housing 13 and the arm 14, and a pressure adjustment screw 27 is adjustably threaded through the cover 26 to adjust the downward biasing pressure exerted by the spring 24 against the flange 15.

Thus, in accordance with an essential feature of the invention, the axial tool 2 axially vibrated by the vibratory drive 5–8 is rapidly rotated, e.g. at a rate of 500 to 5000 rpm, by the rotary drive 18–23 to produce a reciprocatingly revolving active tool surface 2a in pressure engagement with the shaped surface 1a of the workpiece 1 to permit the abrasive wear of the tool 2 to be not localized but distributed uniformly over its periphery.

In accordance with a further essential feature of the invention, a load, i.e. a reciprocatingly revolving resistance, encountered by the active tool surface 2a in abrasive pressure engagement with the shaped surface 1a of the workpiece 1 is instantaneously sensed.

As shown in FIG. 3, the workpiece 1 is securely mounted on a worktable 28 which is designed in a cross-feed arrangement and driven by a pair of motors 29 and 30 to displace the workpiece 1 in an X-Y plane. The X-axis motor 29 and the Y-axis motor 30 are fed with control drive pulses furnished from an NC (numerical control) unit 31 having a clock pulse generator 32 associated therewith. The generator 32 provides a train of clock pulses which are distributed in the unit 31 into X-axis component drive pulses and Y-axis component drive pulses in accordance with prestored data for a path of displacement of the workpiece 1 relative to the tool 2. The path is preprogrammed so as to allow the tool with a given original radius to precisely follow the shaped contour 1a three-dimensionally in the example of FIG. 3 and two-dimensionally in the example of FIG. 2. The rate of relative displacement along the programmed path is determined by the output frequency of the clock generator 32 which is here variable.

In order to instantaneously sense the reciprocatingly revolving resistance encountered by the active tool surface 2a of the tool 2, there is provided a torque sensor 33 which may be disposed in rotation sensing relationship with the tool 2 as shown in FIG. 2, or with the adapter 6 as shown in FIG. 3. The sensor 33 is here designed to sense a rotational component of the load or resistance and preferably a further sensor 34 may be provided to sense a reciprocatory component of the load or resistance encountered by the reciprocatingly revolving active tool surface 2a. The latter sensor 34 may comprise a ring material 34a of a high magnetic permeability fitted to securely receive the adapter 6 in the housing 11 as shown, or the tool 2 in the block 12 and a coil 34b energizable by a power supply 34c and having output sensing terminals 34d connected to a servo-control circuit 35 as will be described. Thus, there develops at the terminals 34d an output signal representing a change in the amplitude of the reciprocation of the tool 2 which change is caused by a corresponding change in the load or resistance encountered by the active tool surface 2a.

The torque sensor 33 may comprise a conventional rotary encoder 33a of magnetic type attached to the tool 2 or adapter 6 and a sensing coil 33b having output terminals 33c connected to a processing circuit 33d which is in turn connected to the servo-control circuit 35. The frequency of pulses developed in a train at the output terminals 33c is proportional to the rate of rotation of the tool 2 and is compared with a fixed reference frequency preset in the processing circuit 33d to provide an output signal representing a change in the rate of rotation of the tool 2, which is fed into the servo-control circuit 35. The output shaft 21 may also be provided with an encoder arrangement as described to provide a reference frequency signal with which the frequency signal developed at the terminals 33c may be compared. Such an encoder as provided likewise produces a train of pulses and the frequency of these pulses represents the input rate of rotation produced by the motor 22 and transmitted to the tool 2. Thus, the processing circuit 33d provides an output signal representing a change in the torque or rotational resistance component of the load encountered by the reciprocatingly revolving active tool surface 2a.

The servo-control circuit 35 is responsive to the output provided by the torque sensor 33 and preferably also to the output provided by the reciprocatory amplitude sensor 34 to provide a control signal from its output 35a which is connected to the clock generator 32 associated with the NC unit 31. The control signal thus provided is applied to the clock generator 32 to modify its output pulse frequency and thus to modify the rate of translational displacement along the given path of the workpiece relative to the vibratingly rotating tool 2 in abrasive pressure engagement therewith, so as to maintain the load or resistance encountered by the tool surface 2a substantially constant. Thus, the rate of removal of the remaining stock V per unit area of the abrasive pressure contact of the active tool surface with the shaped contour is effectively maintained substantially constant in spite of changes in the area A so that a maximum or optimum finishing speed is obtained (FIG. 1). Furthermore, the rate of wear is effectively rendered substantially constant throughout the entire course of finishing along the surface contour S. This enables a highly accurate prediction of the optimum path (L) to be followed by the axis O of the tool with respect to the workpiece W, and hence a highly enhanced finishing precision. Given a precise information for the rate of tool wear, a nominal path tentatively programmed on the basis of the desired finish contour So and the original radius of the tool 2 may be readily modified thereby to yield an actual path to be followed by the tool axis O relative to the workpiece W.

While such a modified path may thus be preprogrammed in the NC unit 31, it is also possible to in-process modify the nominal path. To this end, the control circuit 35 may also be designed to derive from the input signals incoming through the terminals 33d and 33e, a further output signal representing the rate of wear of the active tool surface 2a and to transmit it through its second output terminal 35b to the NC unit 31 to enable the latter to instantaneously modify the preprogrammed nominal path data thereby. The control circuit 35 may further have additional outputs 35c and 35d to apply controls to the driver circuit 23 for the motor 22 and to the power supply 7 for the high-frequency vibration imparted to the tool 2.

What is claimed is:

1. A method of abrasively finishing a shaped workpiece surface with a vibratory axial tool by means of abrasive grits, the method comprising the steps of:
   (a) rotating the axial tool about a longitudinal axis thereof while vibrating it in the direction of said axis to provide a reciprocatingly revolving active tool surface;
   (b) bringing the reciprocatingly revolving active tool surface into pressure engagement with a portion of said shaped surface of the workpiece in the presence of the abrasive grits therebetween;

(c) relatively displacing said axial tool and said workpiece generally translationally and transverse to said longitudinal axis so that the reciprocatingly revolving active tool surface sweeps starting with said portion and successively over an entire area of said shaped surface while maintaining the abrasive pressure engagement therewith;

(d) instantaneously sensing a load encountered by said reciprocatingly revolving active tool surface in the abrasive pressure engagement with said shaped surface to produce an output signal representing an instantaneous change in said load; and (e) in response to said output signal, controlling said relative translational displacement between the tool and the workpiece so as to maintain the load exerted on said reciprocatingly revolving active tool surface substantially constant.

2. The method defined in claim 1, further comprising the steps of programming a predetermined path of displacement of said axis relative to said workpiece for step (d), deriving from said output signal a further instantaneous signal representing a wear of said tool, and modifying said programmed path for actual relative displacement between said axis and the workpiece in accordance with said further signal so that said load is maintained substantially constant.

3. The method defined in claim 1 or claim 2 wherein said load is a reciprocatingly revolutional resistance encountered by said active tool surface, and in step (e) the rate of said relative translational displacement is controlled so as to maintain said resistance substantially constant.

4. An apparatus for abrasively finishing a shaped workpiece surface with an axial tool by means of abrasive grits in which the axial tool is vibrated in the direction of a longitudinal axis thereof by first drive means, the apparatus including:

second drive means for rotating the vibrating tool about said axis to produce a reciprocatingly revolving active tool surface;

means for positioning the tool and the workpiece relative to each other to bring said reciprocatingly revolving active tool surface into pressure engagement with portion of said shaped surface of the workpiece in the presence of the abrasive grits therebetween and to relatively displace the tool and the workpiece generally translationally and transverse to said longitudinal axis so that the reciprocatingly revolving active tool surface sweeps starting with said portion and successively over an entire area of the shaped surface while maintaining the abrasive pressure engagement therewith;

means for instantaneously sensing a load encountered by the reciprocatingly revolving active tool surface in the abrasive pressure engagement with the shaped surface to produce and output signal representing an instantaneous change in said load; and means responsive to said output signal for controlling the relative translational displacement between the tool and the workpiece so as to maintain the load exerted on the reciprocatingly revolving active tool surface substantially constant.

* * * * *